Aug. 7, 1945.  N. M. ERDAHL  2,381,731
REVOLVING CRANE
Filed May 17, 1943  11 Sheets-Sheet 1

INVENTOR.
NICHOLAS M. ERDAHL
BY
ATTORNEY.

Aug. 7, 1945.   N. M. ERDAHL   2,381,731
REVOLVING CRANE
Filed May 17, 1943   11 Sheets-Sheet 2

INVENTOR.
NICHOLAS M. ERDAHL
BY
ATTORNEY.

Aug. 7, 1945.  N. M. ERDAHL  2,381,731
REVOLVING CRANE
Filed May 17, 1943   11 Sheets-Sheet 4

INVENTOR.
NICHOLAS M. ERDAHL
BY
ATTORNEY.

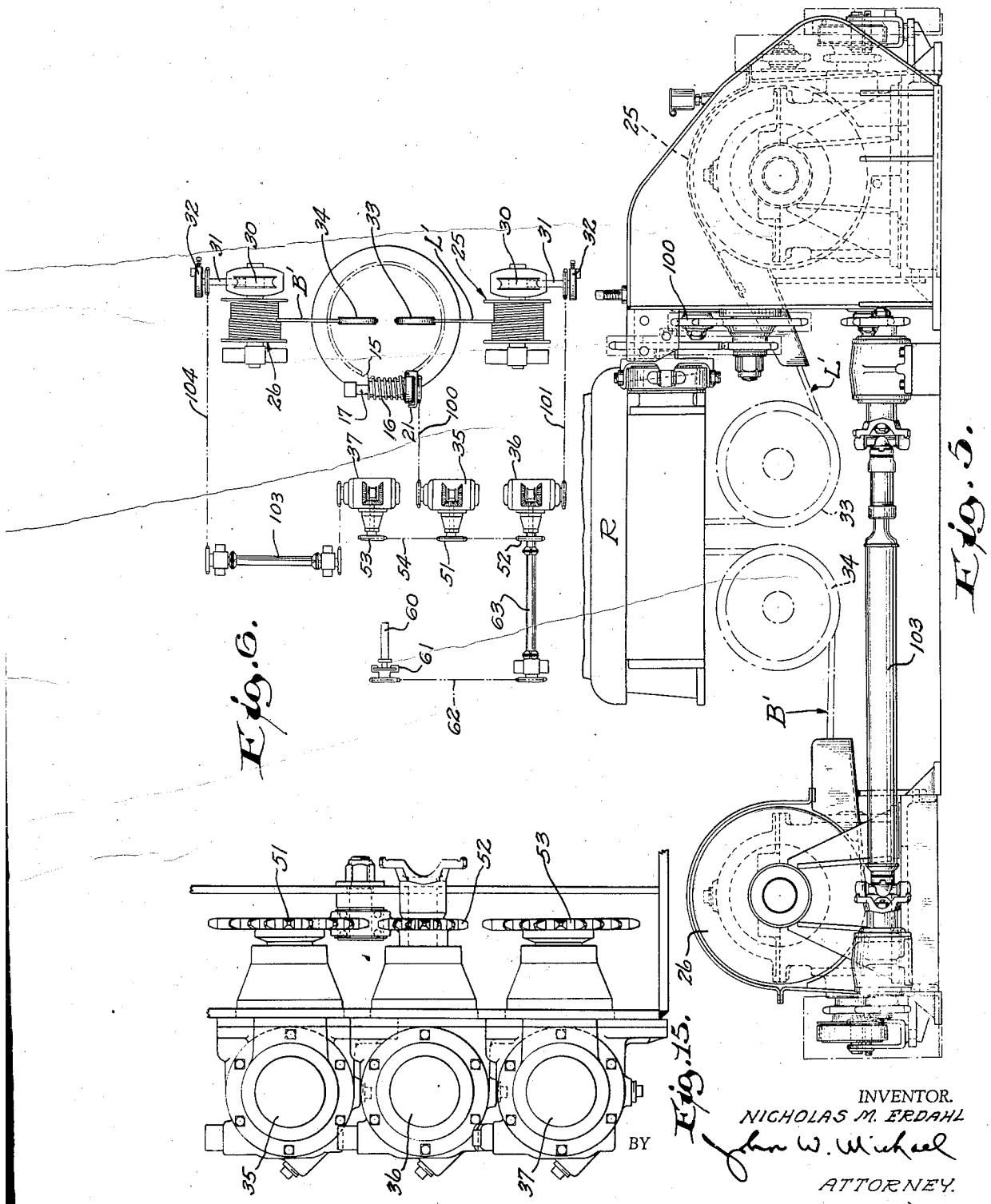

Aug. 7, 1945.  N. M. ERDAHL  2,381,731
REVOLVING CRANE
Filed May 17, 1943  11 Sheets-Sheet 6
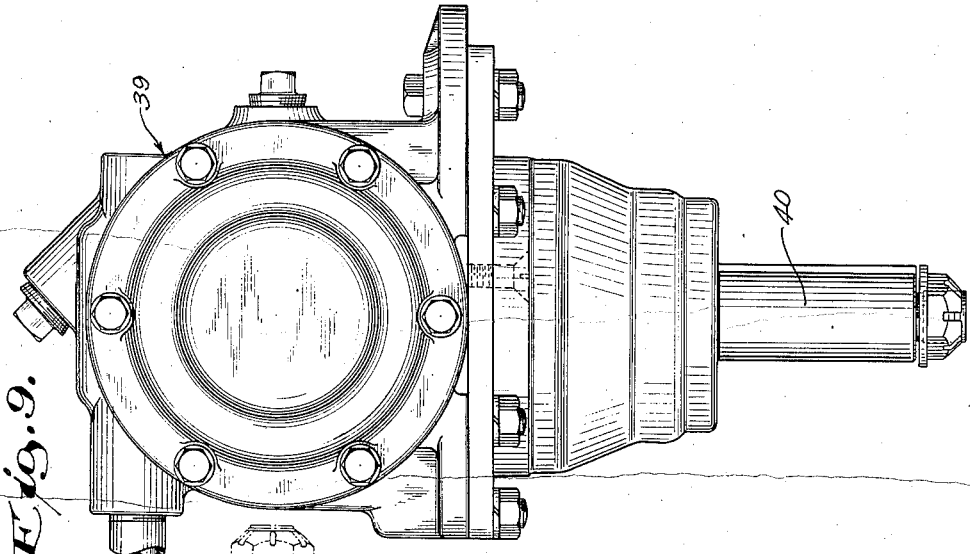
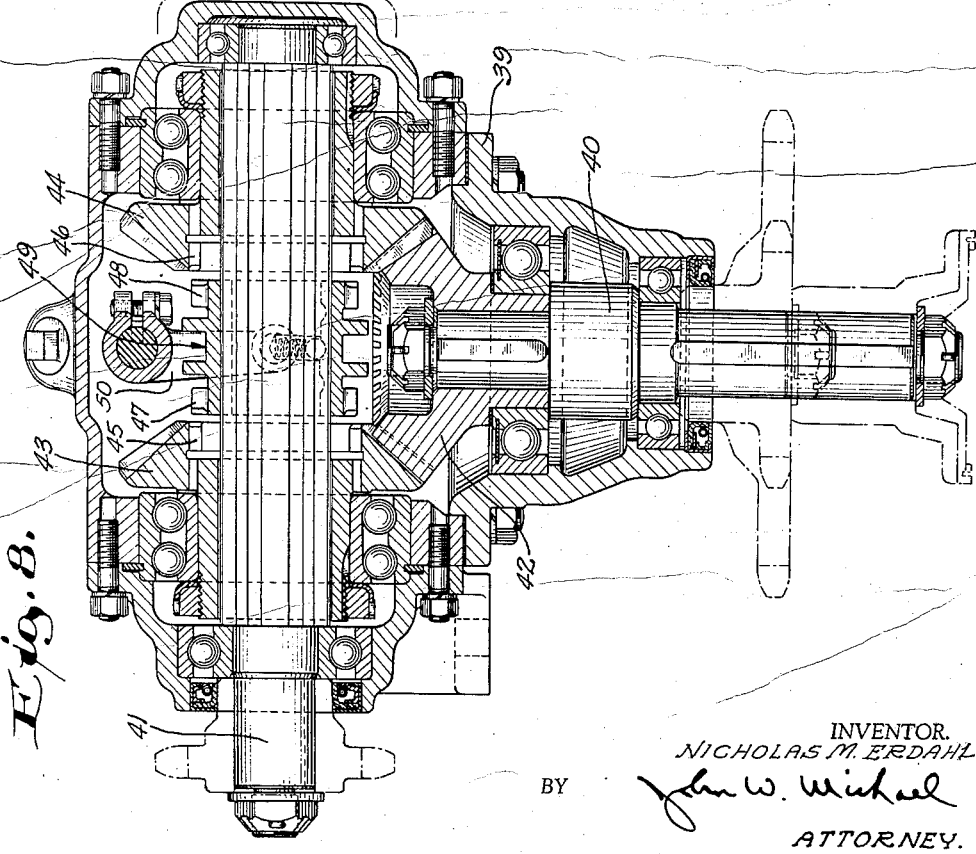
INVENTOR.
NICHOLAS M. ERDAHL
BY John W. Michael
ATTORNEY.

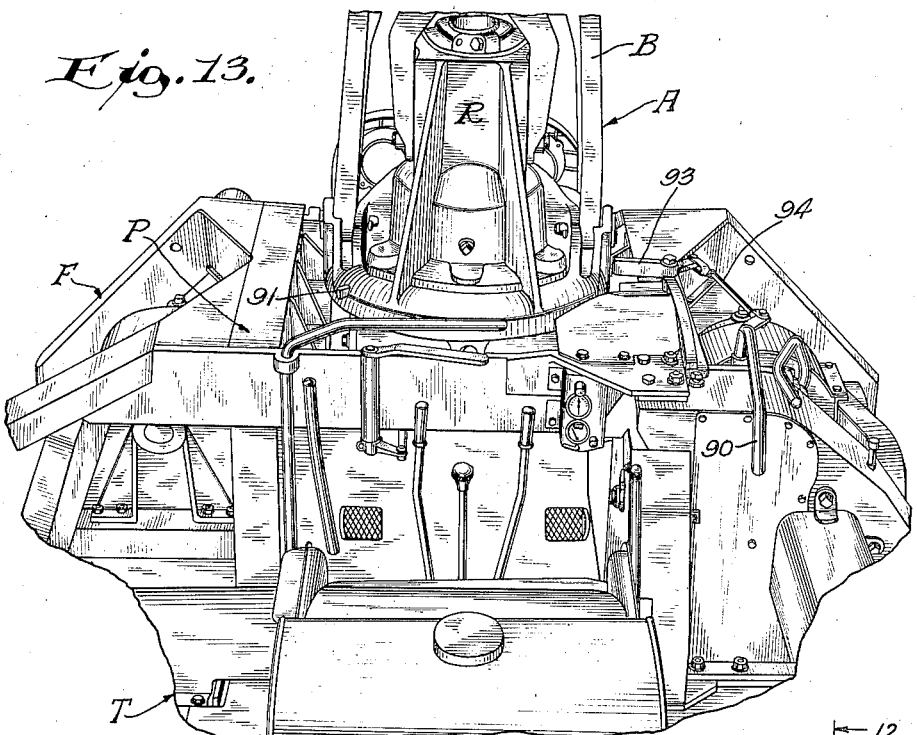
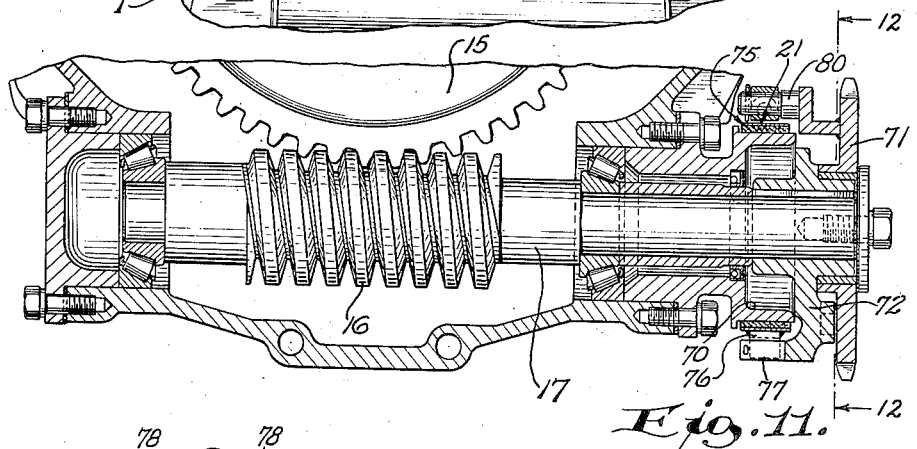
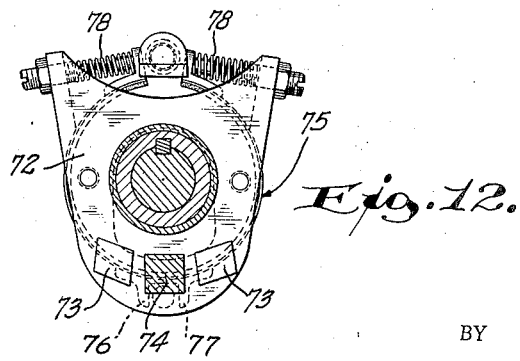

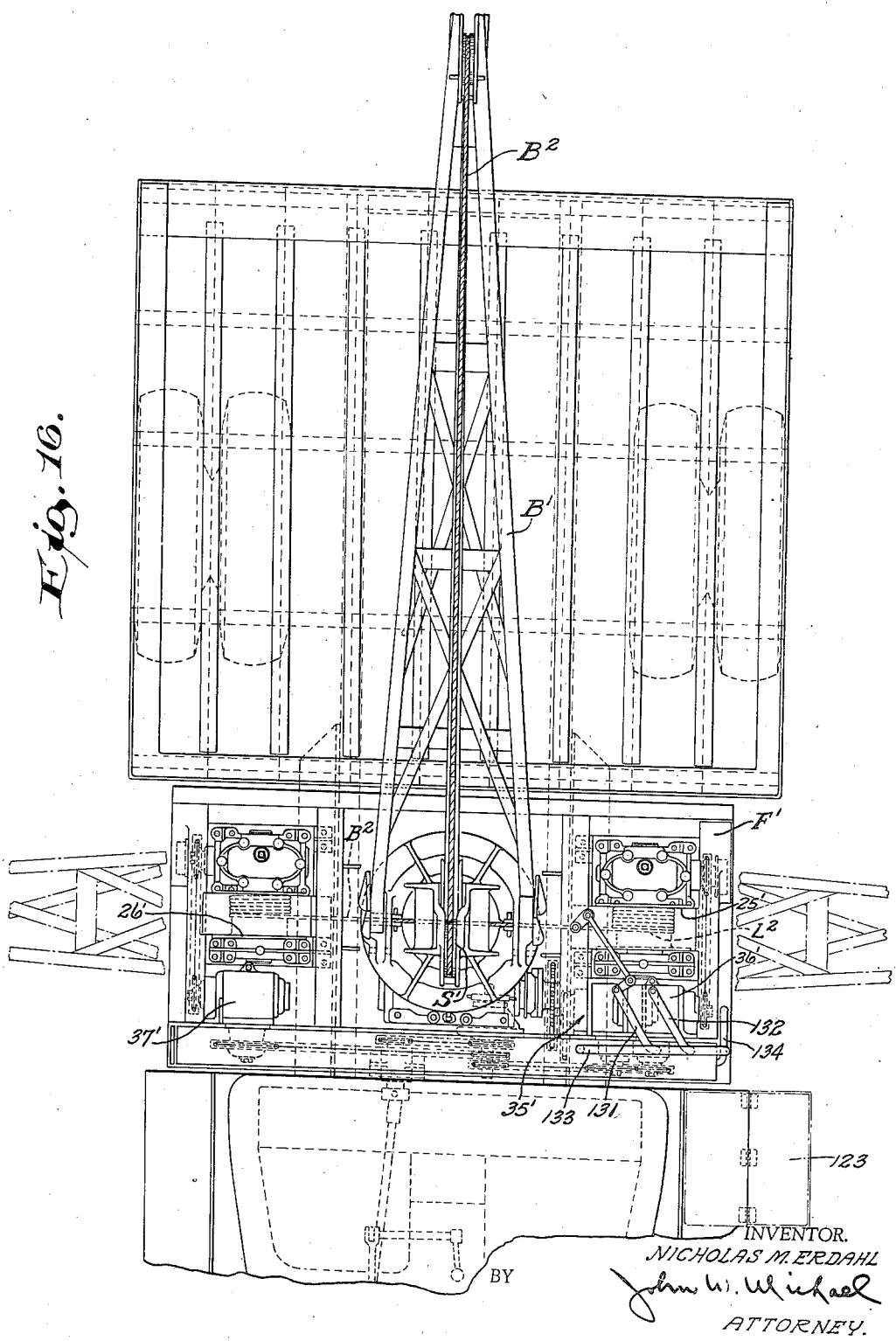

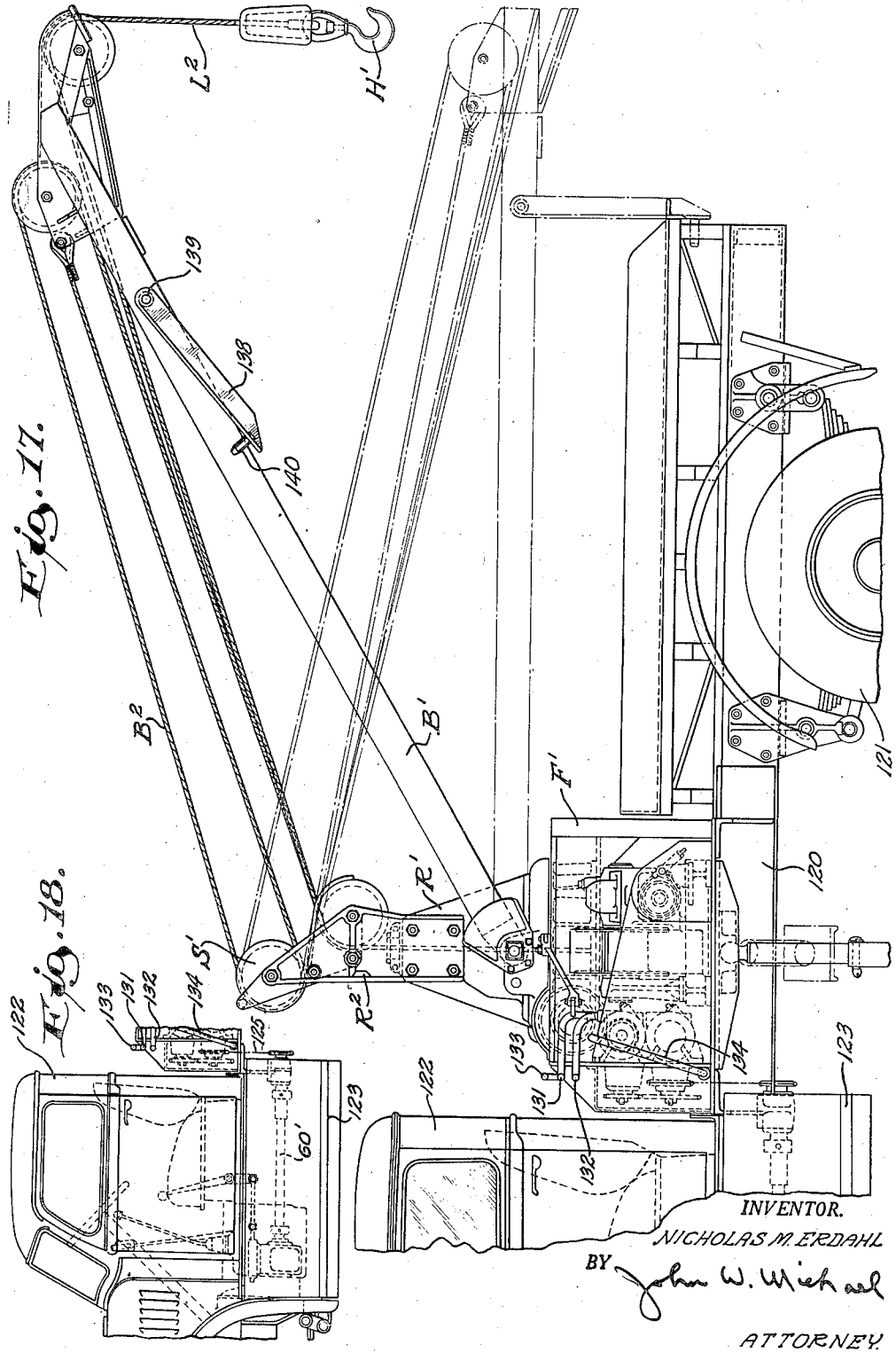

INVENTOR.
NICHOLAS M. ERDAHL
ATTORNEY.

Aug. 7, 1945.  N. M. ERDAHL  2,381,731
REVOLVING CRANE
Filed May 17, 1943  11 Sheets-Sheet 11
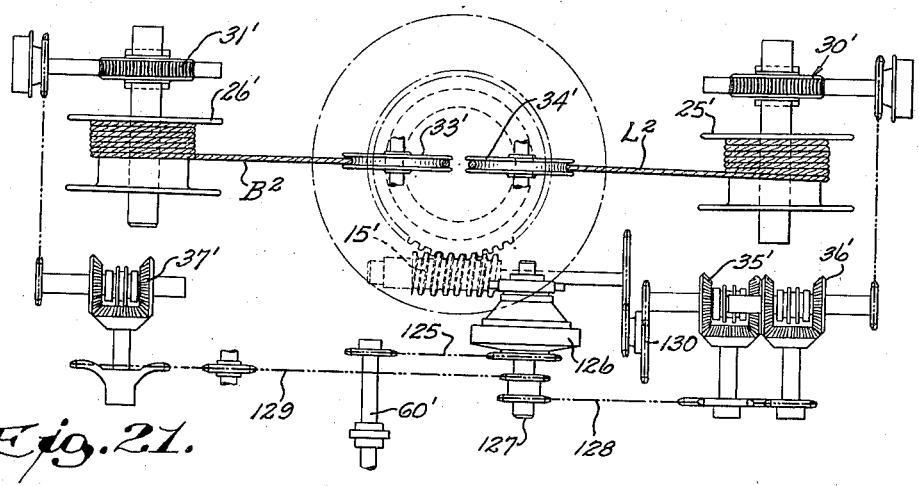
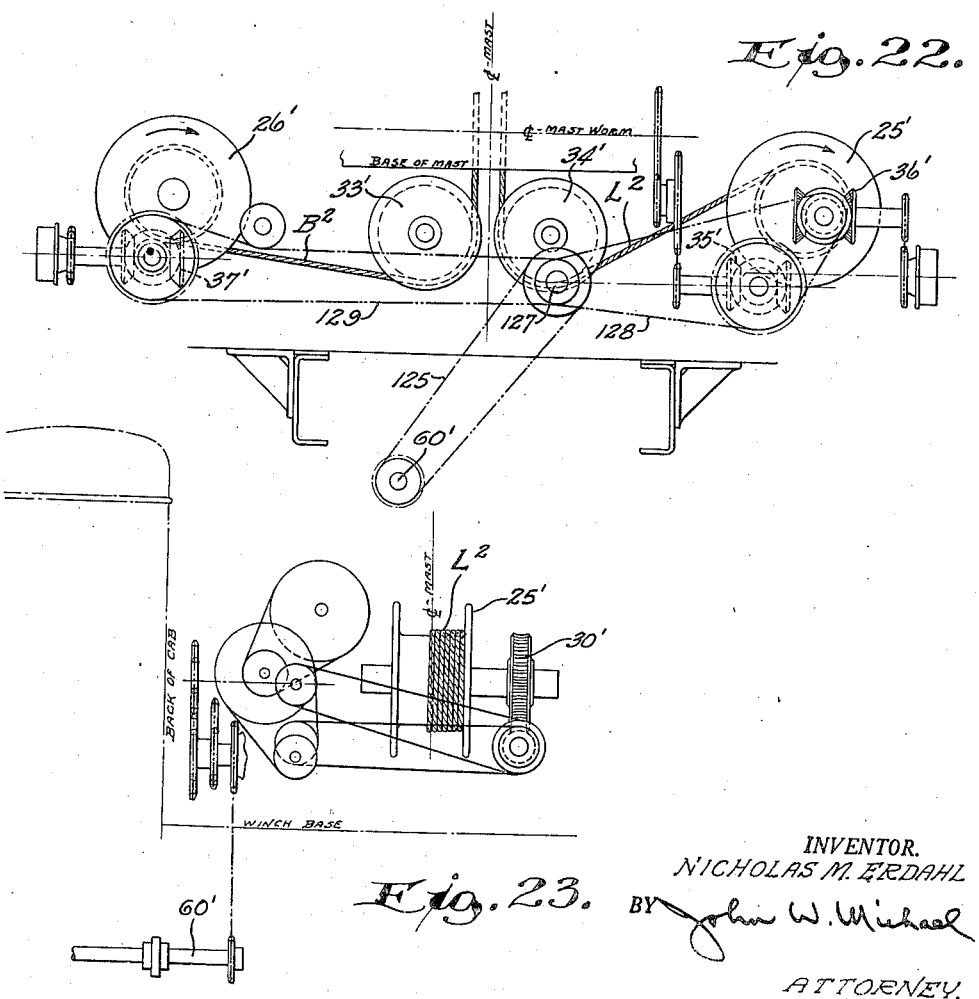
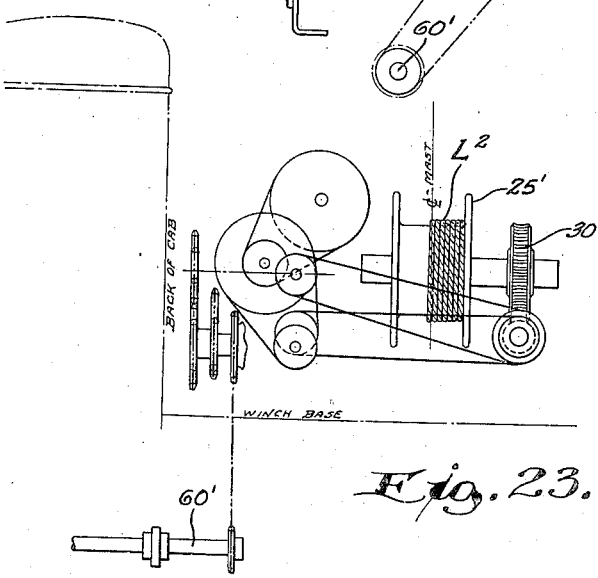
INVENTOR.
NICHOLAS M. ERDAHL
BY John W. Michael
ATTORNEY.

Patented Aug. 7, 1945

2,381,731

UNITED STATES PATENT OFFICE 2,381,731

REVOLVING CRANE

Nicholas M. Erdahl, Milwaukee, Wis., assignor to Trackson Company, Milwaukee, Wis., a corporation of Wisconsin Application May 17, 1943, Serial No. 487,230

31 Claims. (Cl. 212—59)

This invention relates to an improvement in rotary cranes, which, while adapted for advantageous embodiment in a crane attachment for tractors, is also capable of use with equal advantage upon other forms or types of mobile or stationary supports.

Where the invention is embodied in a crane attachment for tractors, it includes a frame which fits down over the tractor and straddles the treads thereof on each side, the horizontal members of the attachment frame constituting a platform which supports all of the operating mechanism as well as the revolving mast upon which the boom is mounted. The usual operating mechanism for a crane of this type includes swing gear or mechanism for sluing the boom of the crane, a topping drum for raising or lowering the boom to control its elevation, and a hoist drum for operating the hoist or load line which is led out over the boom and which is attached to the load.

The present application is a continuation in part of my application for "Revolving crane attachment for tractors," filed January 18, 1943, Ser. No. 472,681.

One of the principal objects of the present invention is to provide a special type of sluing platform, inclusive of a fixed mast and a revolving mast, and a sluing mechanism, preferably a worm and worm wheel, both of which are so specially constituted and so advantageously organized that the load transmitted to the revolving mast by the boom will be taken entirely by the revolving and fixed masts of the sluing platform, the sluing mechanism or swing gear itself being relieved of all such load and yet being effectively interconnected with the revolving mast to transmit torque thereto. Excessive wear and tear on or the application of destructive stresses to the swing gear is precluded.

Another object of the invention is to provide a crane of this character and wherein the sluing mechanism or swing gear is equipped with novel means for automatically stopping the same in any position to which the revolving mast is swung as soon as the transmission of power to the sluing mechanism from the power plant of the tractor ceases.

Another object of the invention is to provide a crane of this character wherein the application of power to the swing gear or sluing mechanism of the boom is automatically relieved when the boom has been turned to a certain angular distance in either direction.

Another important object of the invention is to simplify and compact the construction of a crane of this character, and this in a structure which is rugged and strong, reliable and highly efficient in operation, convenient to control, and adapted to be readily and easily applied to standard tractors.

In carrying out the present invention the sluing mechanism and sluing platform of the crane are constituted by providing first a stationary mast which includes a hollow upright or vertical column. The column, at its lower end, has integrally formed therewith an enlarged horizontal base which is applied directly to the frame of the crane and is securely bolted thereon. Around its periphery the base has an integral upstanding wall, spaced from the column and coacting therewith to define an enclosure for the swing gear. The upper end of this upstanding wall is also constituted to provide a bearing support.

Fitted over the stationary mast is a revolving mast which is also hollow but larger than the column so as to be spaced therefrom. The lower end of the revolving mast is outwardly flared so as to overlie the upper end of the upstanding wall of the base of the stationary mast.

The confronting surfaces of the upper end of the upstanding wall of the base and the lower end of the outwardly flaring portion of the revolving mast are provided with bearing race-ways. Anti-friction bearings, preferably ball bearings, are disposed in these race-ways, whereby the revolving mast at its lower end is directly supported on the base of the stationary mast.

Adjacent the upper end of the stationary mast a second set of bearings, preferably roller bearings, is interposed between the stationary mast and the revolving mast.

A driving sleeve is rotatably fitted on the lower end of the column of the stationary mast, suitable bearings being interposed between the driving sleeve and the column. The swing gear also includes a worm wheel fixed to the lower end of the driving sleeve and meshing with a driving worm, the shaft of which is rotatably supported on the base of the fixed mast. The worm and worm wheel are both enclosed in the housing or enclosed space defined by the lower end of the column, its base and the upstanding outer wall of the base, and they are in spaced relation to the revolving mast. An intermediate portion of the driving sleeve has an outwardly directed annular driving flange which underlies a horizontal portion of the revolving mast although slightly spaced therefrom and free thereof. At spaced angular intervals this driving flange is formed with key-ways in the form of notches. Keys are welded or otherwise suitably secured to the revolving mast and project down into the key-ways of the driving sleeve. These keys are fitted in their key-ways so as to effectively transmit torque, but they may shift vertically therein or lengthwise of the key-ways so that no load imposed on the revolving mast may be transmitted to the swing gear. In other words, a floatable driving connection is provided.

An automatic brake is combined with the shaft of the driving worm of the swing gear or sluing mechanism and functions automatically to stop and hold the revolving mast against turning at the instant transmission of power to the worm shaft ceases.

The present invention proposes to dispose the topping drum on one side of the mast and the hoist or load drum on the opposite side thereof. Both drums, like the swing gear, are driven by their respective worm and worm wheels. The independent worm mechanisms of the swing gear, hoist drum, and topping drum are driven through independent reversing gear sets arranged, when the invention is embodied in the crane adapted for use on tractors, in pile formation on the same side of the tractor as the hoist drum and driven by a common chain drive combined with the input ends of the reversing gear sets and actuated through a motion transmission line driven from the output shaft or power take-off of the prime mover through a crane master clutch. The motion transmission means employed between the power take-off and the input ends of the reversing gear sets is varied as may be desirable when the invention is embodied in a crane adapted for use on motor trucks or on stationary platforms. In any event, between each reversing gear set and the worm gear mechanism of the swing gear, hoist drum, and the topping drum is an independent drive line, made up, in the case of the swing gear set and the housing drum, of a sprocket chain drive, and in the instance of the topping drum, due to its disposition on the opposite side of the tractor, from its reversing gear set, of a transversely extending shaft drive as well as of a sprocket chain drive.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 5 is a view in side elevation of the structure shown in Figure 4;

Figure 6 is a diametrical layout showing the drive mechanism for the swing gear, hoist and topping drums;

Figure 7 is a view partly in elevation and partly in section, showing the common chain drive for the input sprockets of the reversing gear sets;

Figure 8 is a view in horizontal section showing one type of reversing gear set that may be advantageously employed;

Figure 9 is a view thereof in end elevation;

Figure 10 is a view in transverse, vertical cross section showing the construction that may be employed for both the hoist and topping drums;

Figure 11 is a view partly in horizontal cross section and partly in top plan, showing the worm gear mechanism for driving the swing gear and the automatic brake combined therewith;

Figure 12 is a view in vertical cross section taken on line 12—12 of Figure 11;

Figure 13 is a perspective view showing the various control levers;

Figure 14 is a detail view illustrating the manner in which the take-up sprocket of the common chain drive for the reversing gear sets is mounted and adjusted;

Figure 15 is a view in elevation illustrating the pile formation of the reversing gear sets of the swing gear and the housing and topping drum;

Figure 16 is a top plan view showing a motor truck equipped with the crane attachment embodying the present invention;

Figure 17 is a fragmentary view in side elevation of the structure shown in Figure 16;

Figure 18 is a fragmentary view of the cab of the truck and its associated instrumentalities;

Figure 21 is a diagrammatic view in top plan illustrating the drive mechanism for the swing gear hoist and topping drum employed when the crane is combined with the truck;

Figure 22 is a diagrammatic view in side elevation of the mechanism shown in Figure 21; and Figure 23 is a view thereof in end elevation looking toward the left-hand end of Figure 21.

Figure 1:
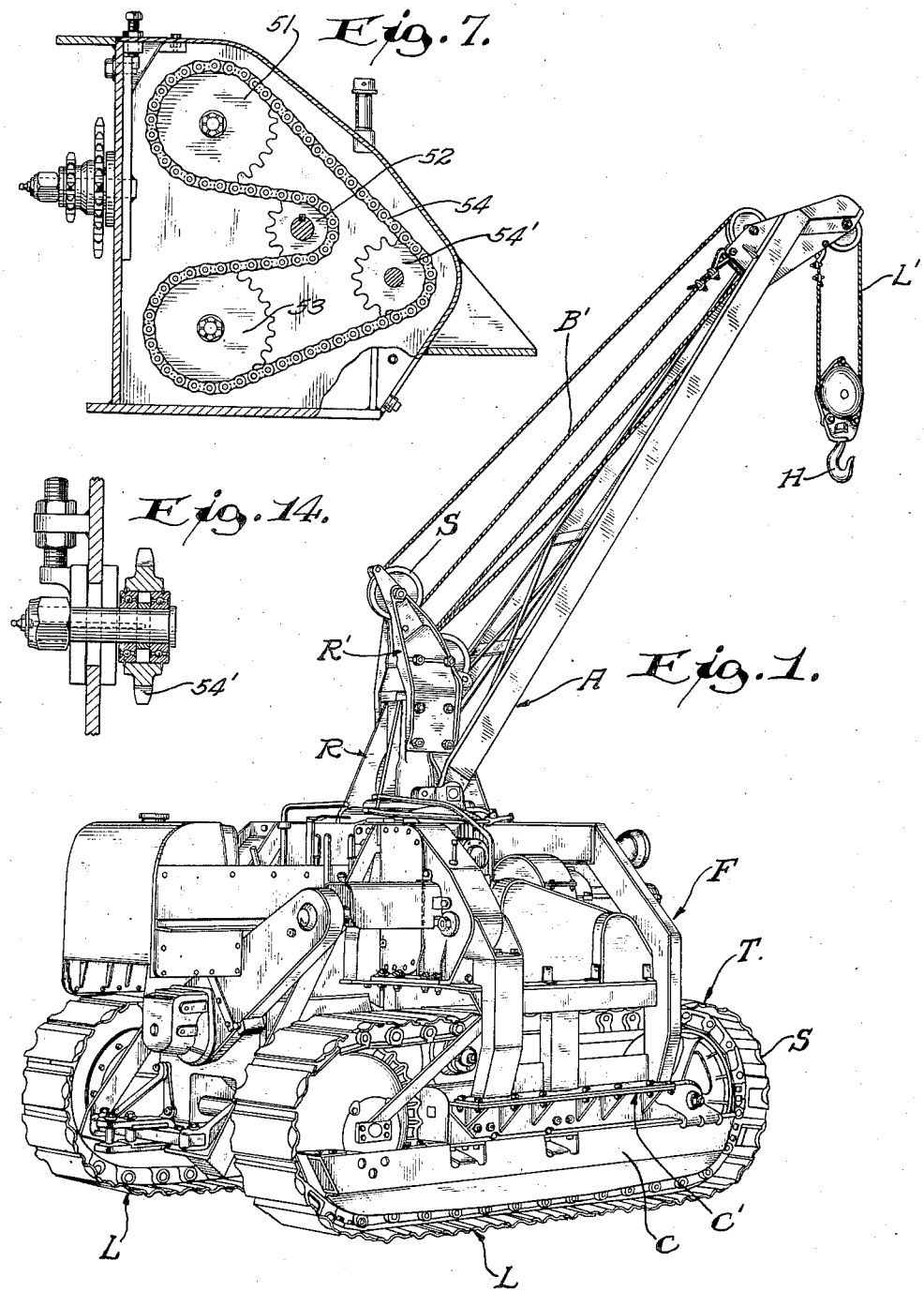
Figure 1 is a perspective view of a tractor equipped with a crane attachment embodying the present invention, the tractor being viewed from one side.
Figure 2:
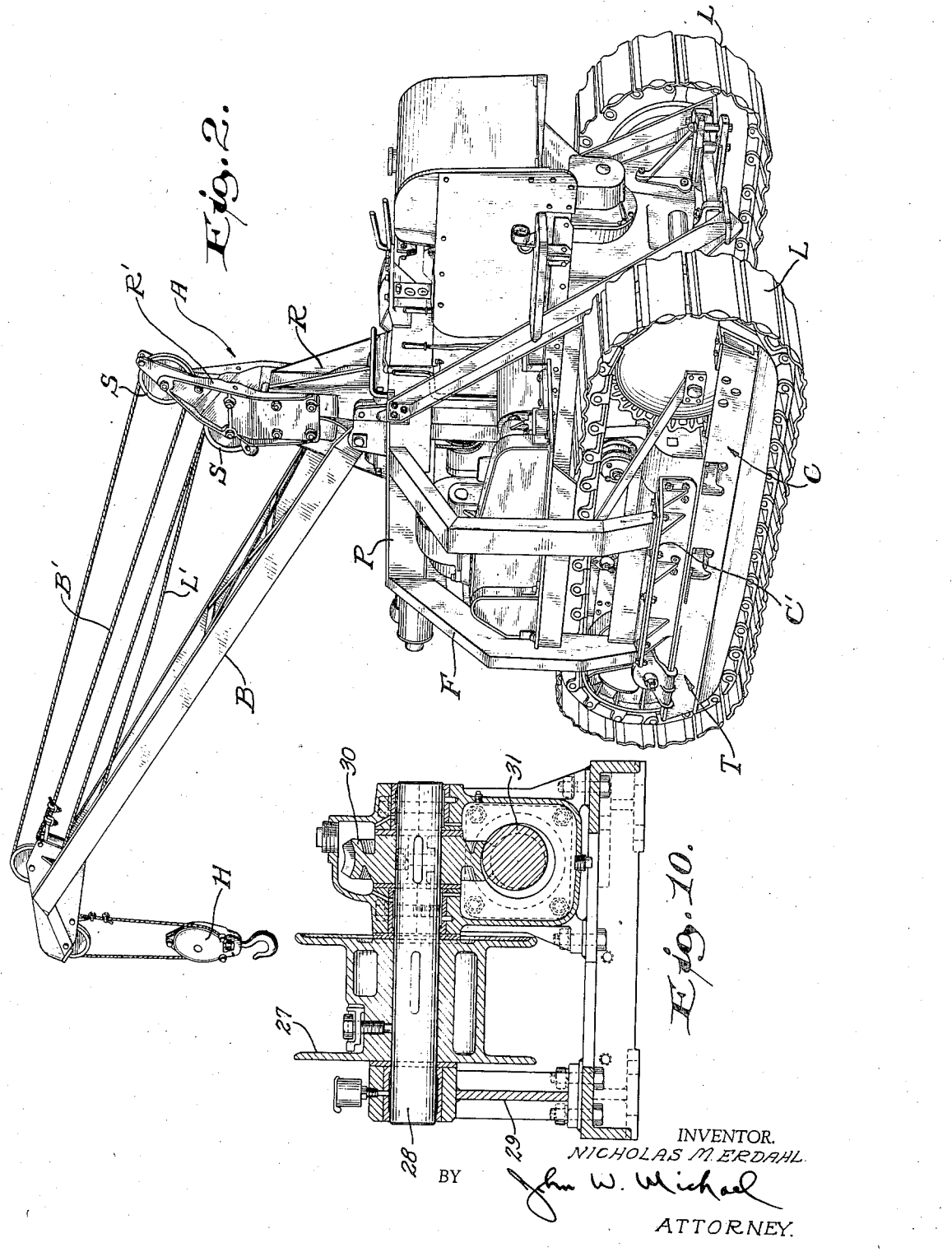
Figure 2 is a perspective view similar to Figure 1 but viewing the tractor from the opposite side thereof.

In the drawings, the invention is shown, for purposes of illustration, as embodied in a crane attachment for tractors, and referring especially to Figures 1 and 2, the crane attachment is designated as a whole at A and is supported upon a tractor designated as a whole at T. The tractor may be of any standard or conventional type, preferably one with self-laying tracks L which are mounted in the usual way on the chassis C of the tractor.

The crane attachment A comprises generally a frame F built up of suitable structural steel members and of generally inverted U-shaped construction so that it is designed and adapted to be set down over the tractor and straddle the treads or self-laying tracks thereof, the lower ends of the frame resting on and being securely bolted or otherwise attached to supporting brackets C' rigidly secured to the chassis of the tractor. The frame also includes horizontal members providing a platform P. In general the frame provides a support for all the instrumentalities which go to make up the crane.

Supported on the platform P on the frame F, and rigidly secured thereto, is a fixed mast, designated generally at M. This fixed mast M (see Figure 3) provides the support for the revolving mast R. The boom or jib B of the crane has its lower end pivotally supported on the revolving mast R and the upper end of the revolving mast R has rigidly attached thereto a suitable mast cap R' upon which pulleys or sheaves S are mounted to provide for the proper reeving of the boom cable B' and load cable or load line L' upon which the hook or grapple H is suspended.

Figure 3:
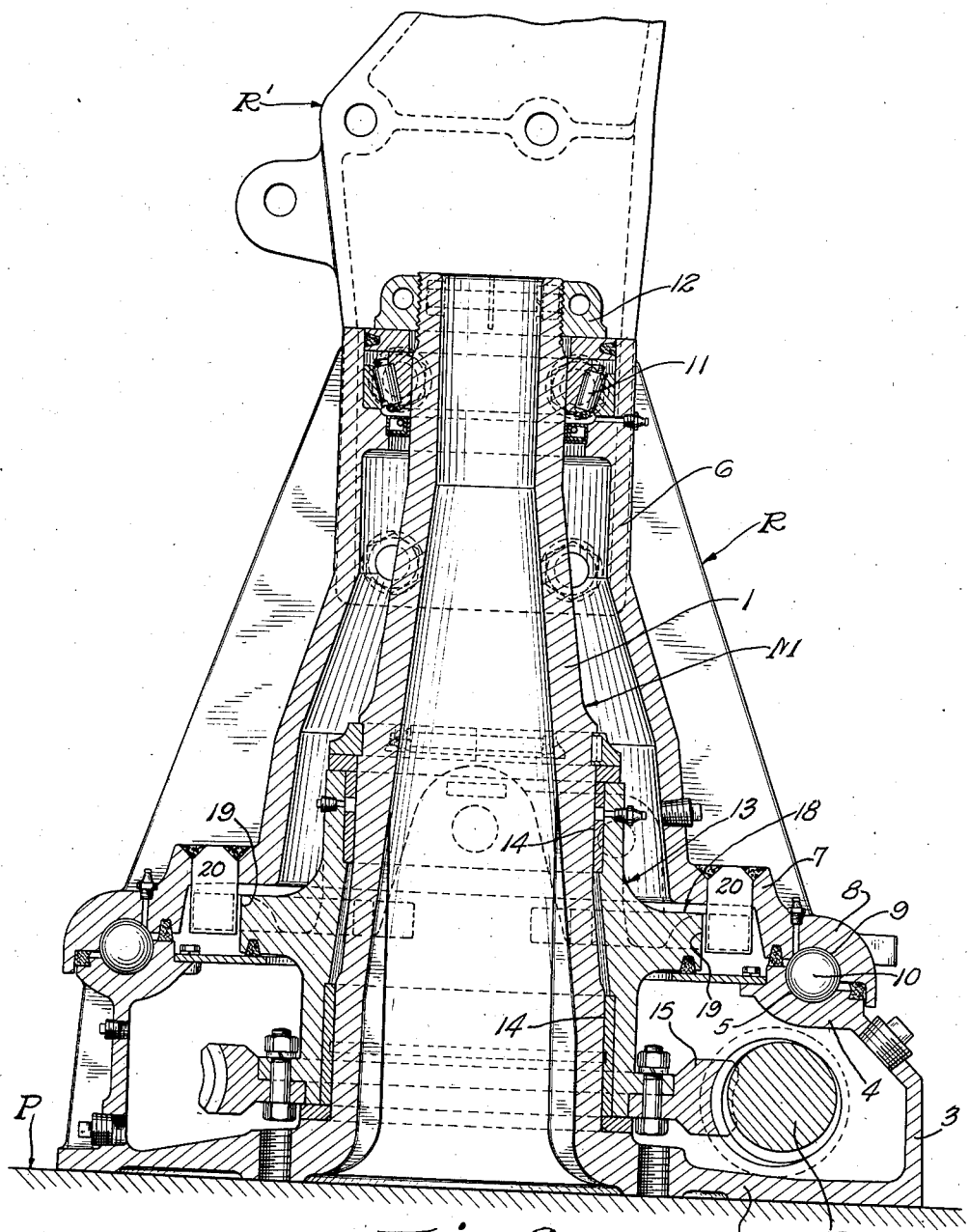
Figure 3 is a view partly in vertical, diametrical cross section and partly in side elevation, illustrating the sluing mechanism and swing gear construction embodying the present invention.

Referring now to Figure 3, the fixed mast M comprises a hollow upright or vertical column 1, the lower end of which has integrally formed therewith an enlarged horizontal base 2 designed to rest flatly on the platform P and to be securely bolted or otherwise fixed thereto. The periphery of the base 2 is formed with an integral upstanding wall 3 spaced from the column 1 and extending first vertically then inwardly and terminating in a thickened substantially horizontally disposed portion or rim 4 formed with an upwardly facing bearing race-way 5.

The revolving mast R also comprises a hollow or tubular casting or heavy metal structure 6 somewhat larger than the column 1 of the fixed mast M, and, although externally ribbed for strength, generally conforming in outline or configuration thereto so as to be adapted to be fitted over the fixed mast and to rotate in respect thereof. The lower portion of the revolving mast R is first extended horizontally outwardly, as indicated at 7, and then provided with a curved or flared portion or rim 8 having its under surface provided with a downwardly facing bearing race-way 9. The parts are so dimensioned and proportioned that the bearing race-way 5 of the base of the fixed mast and the bearing race-way 9 of the revolving mast are in cooperative relation and are designed to cooperate with ball bearings 10 interfitted therewith.

Roller bearings 11 are interposed between the fixed mast M and revolving mast R adjacent the upper end of the revolving mast. A collar 12, threaded on the upper end of the fixed mast and coacting with suitable structure on the revolving mast, precludes axial displacement of these parts. The bearings between the fixed mast M and the revolving mast R provide for the direct transmission of all load from the boom B and the revolving mast R to the fixed mast M and the base thereof.

A driving sleeve, designated generally at 13, is rotatably supported on the lower portion of the column 1 of the fixed mast M, bearing bushings 14 being interposed between the sleeve and the column 1.

The driving sleeve 14 is spaced throughout its extent from the revolving mast except as hereinafter described. A worm wheel 15 is bolted or otherwise suitably fixed to the end of the driving sleeve and meshes with a driving worm 16 provided on a worm shaft 17 and rotatably supported in the base of the fixed mast (see also Figure 11). It is through this worm gear mechanism constituted of the worm wheel 15 and driving worm 16 that the sluing motion is applied through the driving sleeve 15 to the boom in the manner now to be described.

The intermediate portion of the driving sleeve 13 is provided with an outwardly directed substantially annular flange 18 machined at spaced angular intervals with key-ways 19. These key-ways are notch-like in form and extend through the top and through the bottom of the driving flange 18 and out through the periphery thereof. The driving flange 18 and its key-ways 19 underlie the horizontal portion 7 of the revolving mast R although they are in spaced relation thereto. Driving keys 20 are welded or otherwise suitably secured to the horizontal portion 7 of the revolving mast R and project downwardly therefrom and into the key-ways or notches 19. The driving keys 20 and key-ways 19 are so dimensioned and interfitted that any driving torque applied to the driving sleeve will be effective transmitted to the revolving mast R. However, the driving keys may move vertically in the key-ways 19 or lengthwise thereof or may tilt therein, and in fact they do so under the influence of the various types of load which the boom transmits to the revolving mast. However, no such vertical, lateral, or tilting motion is transmitted to the driving sleeve. This is a highly important advantage in that the worm gear mechanism constituted by the worm 15 and worm wheel 16 are relieved of all such loads and have imposed upon them the sole function of transmitting the driving torque required to slue the boom.

An automatic brake designated generally at 21 is combined with the worm shaft 17 to automatically lock the swing gear and consequently the revolving mast R and boom B in any position in which it may be located when the application of power to the worm shaft 17 ceases, but the details of this construction will be described as the driving mechanism for the swing gear and other instrumentalities are disclosed in detail.

Figure 4:
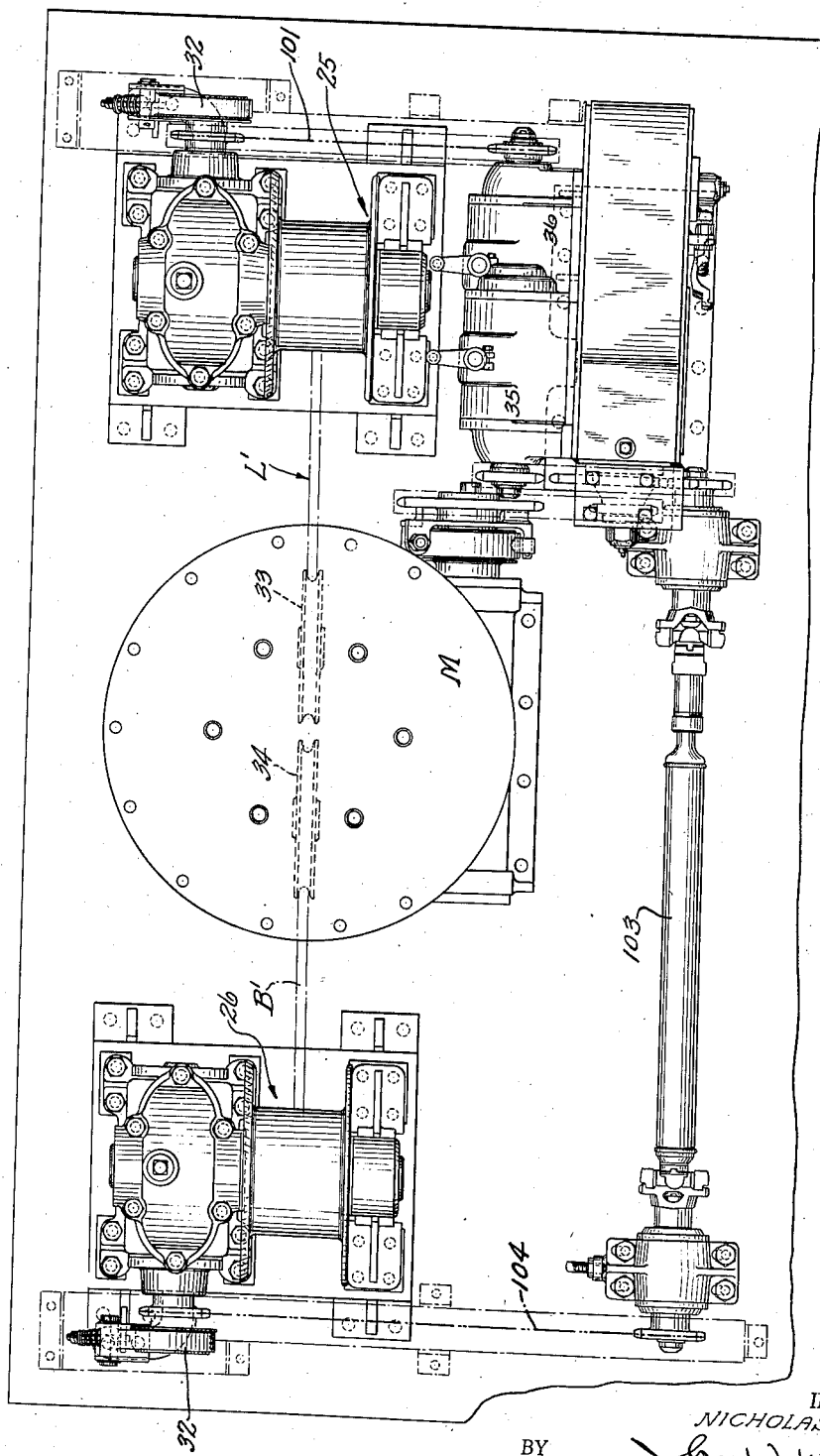
Figure 4 is a view in top plan illustrating the general arrangement of the sluing mechanism, the hoist and topping drums, and the way in which they are driven.
Figure 19:
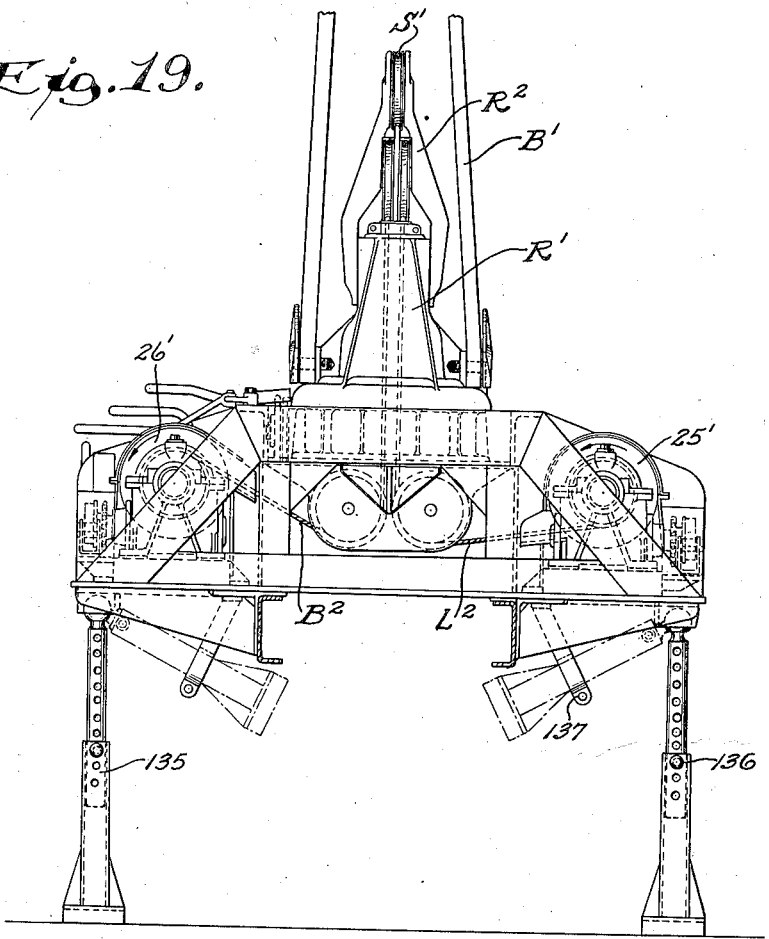
Figure 19 is a view in end elevation, parts being shown in transverse, vertical cross section for the sake of illustration showing the spuds or jacks which are employed to enhance the stability of the truck.
Figure 20:
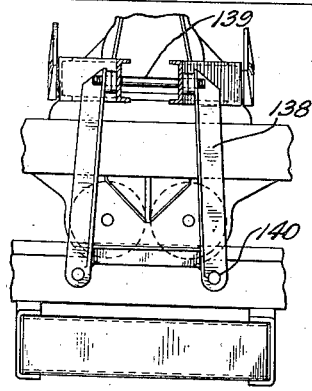
Figure 20 is a fragmentary view, partly in end elevation and partly in transverse, vertical cross section, illustrating the means employed for supporting the boom when the crane is being transported from one place to another.

A hoisting drum or winch, designated generally at 25, is supported on the frame F at one side of the tractor (see Figures 4, 5, and 6). A similar drum or winch 26, utilized for topping, that is, raising or lowering the boom, is supported on the frame F on the opposite side of the tractor.

The winch or drums 25 and 26 may be of any suitable or standard construction. One construction which may be advantageously employed is shown in detail in Figure 10 and comprises a drum 27 keyed to a shaft 28 supported for rotation in suitable bearings on the winch frame 29. A worm wheel 30 is keyed or otherwise suitably secured to the shaft 28 and is driven by a driving worm 31 also rotatably supported in suitable bearings provided on the winch frame. The worm 31 and worm wheel 30 are suitably enclosed, as illustrated in Figure 10.

Thus the hoisting drum and topping drum, just as in the instance of the swing gear, are provided with independent worm gear mechanism for applying the drive thereto. In each instance the worm gear mechanisms are self-locking. In addition, the hoisting drum and topping drum are equipped with automatic brakes. This may be advantageously accomplished, as illustrated in Figure 4, by equipping the projecting end of each worm shaft 31 with a standard automatic brake 32. With such an arrangement the hoisting drum and topping drum are driven under power both forward and reverse so that positive and accurate control is assured at all times.

One end of the boom cable B' is anchored to and reeved about the topping drum 26. Similarly one end of the load or cable end L' is reeved about the hoisting drum 25. The runs of these boom and hoist lines that extend from the drums 25 and 26, pass over guide pulleys 33 and 34 (see Figures 4 and 5) disposed just below the platform P and symmetrically with respect to the common vertical axis of the masts M and R and then up through the hollow fixed mast M and over the sheaves S of the mast cap R'.

The worm gear mechanism for driving the swing gear, the hoisting drum, and the topping drum are driven through independent reversing gear sets, designated at 35, 36, and 37, respectively.

These gear sets are of identical construction and may be advantageously constituted as illustrated in Figures 8 and 9. Each comprises a suitable gear casing or housing 39 having bearings supporting an input or drive shaft 40 and an output or driven shaft 41. A beveled driving pinion 42 is fixed to the drive shaft 40 and meshes with driven bevel gears 43 and 44 loosely fitted on the driven shaft 41. The confronting faces of the gears are formed with clutch jaws 45 and 46 designed to be selectively engaged by cooperable clutch members 47 and 48 formed at the ends of a clutch sleeve 49 splined on the driven shaft 41 and controlled as to position by a shifting yoke 50 mounted within the casing of the reversing gear set and connected by suitable links and levers or a similar motion transmission train to a control lever within convenient reach of the operator.

The reversing gear sets 35, 36, and 37 are arranged in pile formation on the frame F and on the same side of the frame as the hoisting drum 25. They are so disposed that their input sprockets, designated respectively at 51, 52, and 53, and which are keyed to the ends of the input shaft of the reversing gear sets which project beyond the hoisting or gear casing thereof, are disposed in a common vertical plane to adapt them to be meshed with a common driving sprocket chain 54 in a manner shown to advantage in Figure 7. An adjustable idler sprocket 54' is also in mesh with the chain 54 (see Figures 7 and 14) and serves to tension the same.

This operative organization of the reversing gear sets is accomplished by disposing them with their major longitudinal axis in the same common vertical plane while displacing one of the units longitudinally or fore and aft along the common plane of the three sets. This disposition of the reversing gear sets makes it practical to carry the drive from their output ends to the respective instrumentalities to be motivated, and also makes it feasible to dispose the sprockets on their input shaft in a common vertical plane. The drive or power supply for the three reversing gear sets is obtained from the power take-off shaft 60 of the tractor and is transmitted through a crane mast clutch 61 (see Figure 6), conveniently controllable by the operator of the crane through a suitable lever, and transmitting power through chain and sprocket gearing 62 to a master drive shaft 63 which couples and directly drives the input shaft of the reversing gear set 36 and consequently also drives the sprocket 52 thereon and the sprocket chain 54 common to all three reversing gear sets.

The output shafts of the reversing gear sets 35 and 36 are operatively connected to the worm gear mechanism for the revolving mast and the worm gear mechanism for the hoisting drum, respectively, and this may be conveniently accomplished through suitable chain and sprocket bearing, designated at 100 and 101, respectively. The output shaft of the reversing gear set 37 is in driving connection with a shaft 103 extending transversely of the frame F of the tractor and in turn driving chain and sprocket gearing 104 which transmits the drive to the worm and gear mechanism for the topping drum 26.

To maintain or spot the boom in any particular position to which it is slued or swung within the range of its movements, the automatic brake 21 previously referred to is combined with the worm shaft of the worm gear drive mechanism for the boom swing gear. This automatic brake 21 is shown to advantage in Figures 11 and 12 and is unique in the fact that the brake drum 70 is fixed, being bolted or otherwise suitably secured to the base of the fixed mast. The driven sprocket 71, which applies the drive to the worm shaft 17, is loosely mounted on the worm shaft adjacent the fixed brake drum 70.

A combination driving hub and brake carrier, designated generally at 72, is keyed to the worm shaft 17 and is disposed adjacent the inner face of the sprocket 71. The sprocket 71 has two driving lugs 73 fixed thereto and disposed on the opposite sides and slightly spaced from a cooperable driven lug 74 welded to the combination driving hub and brake carrier. A brake band assembly, designated generally at 75, is mounted on the combined driving hub and brake carrier so as to be supported thereby and rotated therewith. The resilient metallic band that carries the brake shoes of the brake band assembly is formed with a U-shaped yoke 76 with which a driving stud 77 integral with the combination driving hub and brake carrier is interfitted. The driving stud 77 serves to cause the brake band assembly to rotate with the combination driving hub and brake carrier 72. Springs 78 interposed between fixed abutments on the driving hub and brake carrier 72, and the usual brake lugs of the brake band assembly, bias the brake shoes into braking engagement with the fixed brake drum 70. For the purpose of automatically releasing the brake shoes upon the application of power to rotate the worm shaft 17 in either direction, a brake operating stud 80 is suitably attached and secured to the driving sprocket 71 and is interposed between the brake lugs of the brake band assembly. With such a construction, when torque is applied to the driving sprocket 71, it imparts an initial rotation thereto relative to the worm shaft 17, until one or the other of the lugs 73 of the driving sprocket come into engagement with the driven lug 74 of the combination driving hub and brake carrier. Upon such engagement the torque is transmitted through the combination driving hub and brake carrier to the worm shaft 17. Prior to this interengagement of one of the lugs 73 and the lugs 74, the brake operating stud 80 is shifted to effect release of the brake shoe which is effective to have braking engagement with the fixed brake drum in the direction of rotation of the brake band assembly.

Suitable control levers are provided for facilitating engagement and disengagement of the clutches of the reversing gear sets and of the crane master clutch, as well as the main clutch of the tractor. No claim is made to the details of this lever-controlled mechanism save in respect of the lever control for the clutch of the swing gear. This particular lever is designated at 90, and is shown to advantage in Figure 13. It is automatically thrown to off position, or clutch disengaging position, upon the rotation of the boom through a predetermined angular distance in either direction. This is accomplished by providing trip lugs 91 and 92 on the base of the revolving mast, and so disposing them that they will engage and shift a trip lever 93 upon predetermined angular movement of the revolving mast and consequently of the boom in either direction. The lever 93 is connected through suitable linkage 94 to the clutch lever 90. In this way excessive turning movement of the boom is automatically prevented.

The crane embodying the present invention is not restricted in its application for use on tractors. In fact, it may be utilized on trucks, loading docks, barges, or may be mounted on skids or on a stationary concrete base. Figures 16 to 23 of the drawings illustrate the manner in which the crane embodying the invention may be advantageously employed upon a truck.

As there shown, the truck includes a chassis or frame 120 supported by wheels 121 and including a cab 122 on which the driver of the truck sits when driving the truck. Preferably, the truck is provided with a folding step or platform 123, which may be extended and utilized by the driver of the truck when the truck is stopped at the point of its use and the crane is to be manipulated. The crane attachment, which is combined with the truck, is in all substantial respects identical with the crane previously described and combined with the tractor, although the parts are dimensioned and proportioned and otherwise fashioned and adapted to enable them to be advantageously utilized with the construction of the truck. For this purpose the frame F' is suitably designed and is securely supported on and secured to the chassis 120 of the truck. The frame, as before, provides a platform upon which a fixed mast is secured, the fixed mast providing a support for the revolvable mast R'. The boom or jib B' has its lower end pivotally supported on the revolvable mast R' and the upper end of the revolvable mast R' has rigidly secured thereto a suitable mast cap R2 upon which the pulleys or sheaves S' are mounted to provide for the proper reeving of the boom cable B2 and load cable or load line L2 upon which the hook or grapple H' is suspended. The revolving mast R' is supported on the fixed mast in the manner shown in Figure 3 and previously described, and in fact the crane itself is identical with that previously shown and described except for the motion transmission means employed to transmit the power from the output shaft or power takeoff of the tractor to the input ends of the re-reversing gear sets, and except for the way in which the reversing gear sets are arranged or located on the truck.

As in the other embodiment of the invention, a hoisting drum or winch, designated at 25', is supported on the truck at one side of the boom, and a similar drum or winch, designated at 26', and utilized for topping, that is raising or lowering the boom, is supported on the frame of the crane on the opposite side of the revolving boom. The winches or drums 25' and 26' are of the construction previously disclosed and described. One end of the boom cable B2 is anchored to and reeved about the topping drum 26'. Similarly, one end of the rope or cable L2 is anchored or fixed to and reeved about the hoisting drum 25'. The runs of these boom and hoist lines that extend from the drums 25' and 26' pass over the guide pulleys 33' and 34' disposed just below the platform and symmetrically with respect to the vertical axis of the fixed and revolvable masts, and then up through the hollow fixed masts and over the sheaves S' of the mast cap R2.

As in the other embodiment of the invention, worm gear mechanism 15' is provided for swinging or sluing the revolvable mast, and consequently also the boom.

Similar worm gear mechanism, designated at 30' and 31', is provided for driving the winches 25' and 26'.

The worm gear mechanisms for driving the swing gear or sluing mechanism of the revolvable mast, and for driving the hoisting drum 25' and the topping drum 26', are driven through independent reversing gear sets, designated generally at 35', 36', and 37', respectively. These reversing gear sets are identical with the sets 35, 36, and 37 previously described. However, they are not arranged in pile formation but are disposed on the truck in the manner illustrated diagrammatically in Figures 21 to 23, inclusive, and they are driven from the output shaft or power takeoff shaft of the truck in a different and special way to adapt the construction for use on a truck. As shown in the drawings, the power takeoff shaft of the truck is designated at 60' and is operatively interconnected by means of chain and sprocket gearing 125 with the driving member of a friction clutch designated at 126. The driven member of this friction clutch 126 has a driven shaft 127 fixed thereto. The shaft 127 is employed to drive the input shafts of the reversing gear sets 35', 36', and 37'. For this purpose chain and sprocket gearing 128 is provided for driving the input shaft of the reversing gear set 36' and similar chain and sprocket gearing 129 is provided for driving the input shaft or reversing gear set 37'. This same sprocket gearing 128 also performs the function of driving the input shaft for the reversing gear set 35' utilized to control the swing gear or sluing mechanism of the boom, the output shaft of the reversing gear set 35' being connected through suitable chain and sprocket gearing 130 to the worm shaft of the worm gear mechanism 15 which directly transmits the motion of the swinging gear or sluing mechanism of the revolvable mast.

Suitable control levers 131, 132, and 133 are provided for controlling the reversing gear sets 35', 36', and 37', and in addition a suitable control lever 134 is provided for engaging and disengaging the friction clutch 126. These control levers are interconnected with the instrumentalities to be controlled through any suitable system of links and levers, and the control levers themselves are conveniently grouped at one side of the tractor so that the operator standing on the folding step 123 may conveniently handle them.

To stabilize the truck construction, when the crane is in use, adjustable jacks or spuds 135 and 136 are provided, the adjustable jacks or spuds being universally connected with the chassis, being made up of telescoping parts releasably held in any adjustment, and being collapsible and foldable when not in use and retained in folded position by hangers or support 137.

When the truck is being moved from place to place, the boom is lowered to a substantially horizontal position and is supported in said position by means of a supporting frame 138 pivotally connected as at 139 with the boom and having pins 140 at its lower end interfittable with openings provided in the transverse member of the chassis of the truck.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

I claim:

1. A crane comprising a frame, a fixed mast having an enlarged base resting on and secured to the frame and having an upright column rigid with the base, a revolvable mast surrounding the fixed mast, bearing means interposed between the revolvable mast and the base and column of the fixed mast, a driving sleeve rotatably supported on the fixed mast, worm gear mechanism for rotating said driving sleeve, said driving sleeve having key-ways therein, keys fixed to the revolving mast and fitted into the key-ways of the driving sleeve to transmit torque from the driving sleeve to the revolvable mast while providing for shifting of the revolvable mast with respect to the fixed mast without transmission of stress to the worm gear mechanism.

2. A crane comprising a frame, a fixed mast including a vertical column having an enlarged base resting on and secured to the frame, a revolvable mast supported on the column and base of the fixed mast for rotation with respect thereto, a driving sleeve rotatably fitted on the lower end of the column of the fixed mast, worm gear mechanism for rotating the driving sleeve, said driving sleeve having a driving flange provided with key-ways in its periphery portion, and keys fixed to the revolvable mast and fitted in said key-ways.

3. A crane comprising a frame, a fixed mast having an enlarged base resting on and secured to the frame and having an upright hollow column rigid with the base, said base having an upstanding wall around its periphery, a revolvable mast surrounding the fixed mast and having its lower end outwardly flared and overlying the upstanding wall of the base of the fixed mast, bearings interposed between the lower flaring portion of the revolvable mast and the upstanding wall of the fixed mast, bearings interposed between the revolvable mast and the upper portion of the column of the fixed mast, a driving sleeve rotatably supported on the lower portion of the fixed mast, worm gear mechanism carried by the driving sleeve and by the base of the fixed mast for rotating the driving sleeve, said driving sleeve having a driving flange disposed adjacent to but spaced from the outwardly flaring portion of the revolvable mast, said driving flange having key-ways therein, and keys fixed to the revolvable mast and fitted in the key-ways on the driving sleeve to transmit torque from the driving sleeve to the revolvable mast while allowing the revolvable mast to shift under the influence of load applied thereto without transmitting stress to the worm gear mechanism.

4. A crane attachment for tractors having a power take-off and comprising a fixed mast, a revolvable mast supported on the fixed mast for rotation with respect thereto, a boom carried by the revolvable mast, worm gear mechanism for rotating the revolvable mast in either direction, a topping drum, a hoist drum, independent worm gear mechanism for driving the drums, an individual reversing gear set seach of said worm gear mechanisms, a common chain drive for said reversing gear sets, and a drive line between the power take-off of the tractor and said common chain drive including a manually operable crane master clutch.

5. A crane attachment for tractors having power take-off means and comprising a frame set down over the tractor, straddling the treads thereof, and supported thereon and secured thereto, a fixed mast disposed substantially centrally to the frame and extending upwardly therefrom, a revolvable mast supported on the fixed mast for rotation with respect thereto, a boom carried by the revolvable mast, worm gear mechanism rotating the revolvable mast in either direction, a topping drum supported on the frame to one side of said masts, a hoisting drum supported on the frame on the opposite sides of the mast from the topping drum, independent worm gear mechanism for driving the drums, an individual reversing gear set for each of said worm gear mechanisms, said gear sets being arranged in pile formation and having input sprockets arranged in a common plane, a single chain drive for the input sprockets of said reversing gear sets, a driving line between the power take-off of the tractor and said single chain drive including a manually operable crane master clutch, chain and sprocket gearing for driving the worm gear mechanism associated with the revolving mast and with the hoisting drum from their respective reversing gear sets, and motion transmission means for driving the topping drum from its reversing gear set including a transversely extending drive shaft and chain and sprocket gearing.

6. A crane attachment for tractors comprising a frame straddling the tractor and secured to the chassis thereof, a revolvable mast mounted on the frame, a boom carried by the mast, swing gear for the mast including a worm and worm wheel, hoisting and topping drums operatively interconnected with the boom, separate worm gear mechanism for driving said drums, an individual reversing gear set operatively interconnected with each of said worm gear mechanisms, and a common drive for said reversing gear sets including a clutch interposed between the power take-off of the tractor and said gear sets.

7. An automatic brake for the swing gear of a rotary crane having a reversely rotatable driving shaft and a driving gear loosely mounted on the driving shaft, and comprising a combination driving hub and brake carrier fixed to the driving shaft, spaced driving lugs mounted on the driving gear, a driven lug fixed to said combination hub and carrier and interposed between said driving lugs, a fixed brake drum surrounding said driving shaft, a brake band assembly mounted on said combination hub and carrier and having brake shoes biased into engagement with said fixed brake drum, a driving connection between said combination hub and carrier and said brake band assembly, and a brake operator carried by the driving gear and cooperable with the brake shoes to automatically release the same upon the application of torque to the driving gear.

8. An automatic brake for the swing gear of a rotary crane having a reversely rotatable driving shaft and a driving sprocket loosely mounted on the drive shaft, a combination driving hub and brake carrier fixed to the shaft adjacent the driving sprocket, spaced driving lugs mounted on the driving sprocket, a cooperable driven lug fixed to the combination hub and brake carrier and loosely interposed between said spaced driving lugs, a brake drum encircling the shaft and fixed in relation thereto, a brake band assembly mounted on said combination hub and carrier and having brake shoes cooperable with said fixed brake drum, springs for biasing the brake shoes into engagement with the brake drum, a driving connection between said combination hub and carrier and said brake band assembly, and a brake-releasing stud mounted on the sprocket and cooperable with the lugs of the brake band assembly to automatically release the brake shoes upon the application of torque to the driving sprocket.

9. A brake for the sluing mechanism of a crane comprising a gear housing, a brake drum fixed to the housing, a drive shaft rotatably supported in the gear housing, a driving gear loosely mounted on the shaft, a combination driving hub and brake carrier keyed to the shaft, a brake band assembly mounted on said carrier and having brake shoes biased into braking engagement with the brake drum, a pair of driving lugs fixed to the driving gear, a cooperable lug fixed to the combination driving hub and brake carrier, and a brake operator carried by the driving gear and cooperable with the brake shoes to automatically release the same upon the application of power to the driving gear in either direction.

10. In a swinging crane, a mast including a fixed column formed with spaced walls at the lower portion thereof, a column revolubly mounted on the outer wall and on the upper end of the fixed column, a sleeve rotatably mounted on the fixed column and extending toward the outer wall thereof, the revoluble column and the sleeve having a connection for transmitting torque only therebetween, and means for rotating the sleeve.

11. In a swinging crane, a mast including a fixed column formed with spaced walls at the lower portion thereof, a column revolubly mounted on the outer wall and on the upper end of the fixed column, a sleeve rotatably mounted on the fixed column and extending toward the outer wall thereof, the revoluble column and the sleeve having a connection within the space jointly enclosed by the columns for transmitting torque only therebetween, and means extending into the space jointly enclosed by the columns for rotating the sleeve.

12. In a swinging crane, a mast including a fixed column formed with spaced walls at the lower portion thereof, a column revolubly mounted on the outer wall and on the upper end of the fixed column and having spaced keys extending therefrom, a sleeve rotatably mounted on the fixed column and extending outwardly therefrom and having a peripheral flange notched to form keyways engageable with the keys for transmitting torque only to the revoluble column, and means for rotating the sleeve.

13. In a swinging crane, a mast including a fixed column, a column revolubly mounted on the fixed column and a sleeve rotatably mounted on the fixed column and having means for transmitting torque only to the revoluble column, a worm wheel mounted on the sleeve, a worm engaging said wheel, means for applying power to said worm for rotation thereof in either direction, and means for holding said worm stationary upon interruption of the power supplied thereto.

14. In a swinging crane, a mast including a fixed column, a column revolubly mounted on the fixed column and a sleeve rotatably mounted on the fixed column and having means for transmitting torque only to the revoluble column, a worm wheel mounted on the sleeve, a worm mounted in a wall of the fixed column and engaging said wheel, means for applying power to said worm for rotation in either direction, and means for holding said worm stationary upon interruption of power supplied thereto and including a drum formed on the wall of the fixed column about an end of said worm, a driving hub for transmitting power to said worm and a band arranged about the drum and engaged by the hub for holding the band out of contact with the drum during rotation of the hub.

15. In a swinging crane, a mast including a fixed column, a column revolubly mounted on the fixed column and a sleeve rotatably mounted on the fixed column and having means for transmitting torque only to the revoluble column, a worm wheel mounted on the sleeve, a worm mounted in a wall of the fixed column and engaging said wheel, means for applying power to said worm for rotation in either direction, and means for holding said worm stationary upon interruption of power supplied thereto and including a drum formed on the wall of the fixed column about an end of said worm, a driving hub for transmitting power to said worm, a band arranged about the drum for gripping engagement therewith and springs urging the band toward the drum, the driving hub engaging the band for opposing the action of the springs so long as power is applied to the hub.

16. In a swinging crane, a mast including a fixed column, a column revolubly mounted on the fixed column and a sleeve rotatably mounted on the fixed column and having means for transmitting torque only to the revoluble column, means for rotating the sleeve, a clutch controlling the application of power to the sleeve only, and means for automatically disengaging said clutch upon movement of the revoluble column through a predetermined angle.

17. In a swinging crane, a mast including a fixed column, a column revolubly mounted on the fixed column and a sleeve rotatably mounted on the fixed column and having means for transmitting torque only to the revoluble column, means for rotating the sleeve, a clutch controlling application of power to the sleeve only, and means for automatically disengaging said clutch and including lugs mounted on the revoluble column and a leverage connected with said clutch and engaging the lugs upon movement of the revoluble column through a predetermined angle.

18. In a swinging crane, a mast including a fixed column and a revoluble column mounted thereon, means for rotating the revoluble column only by the positive application of power thereto, a boom mounted on the revoluble column, cables mounted on said mast and said boom for hoisting the load and for lifting said boom, winches mounted adjacent said mast for severally winding up said cables, and reversible means for independently rotating said winches.

19. In a swinging crane, a mast including a fixed column and a revoluble column mounted thereon, means for rotating the revoluble column only by the positive application of power thereto, a boom mounted on the revoluble column, cables mounted on said mast and said boom for hoisting the load and for lifting said boom, winches mounted adjacent said mast for severally winding up said cables, and reversible means for independently rotating said winches and including gear sets locking against reversal by the load, the gear sets being so arranged as to receive power from a common source.

20. In a swinging crane, a mast including a fixed column and a revoluble column mounted thereon, means for rotating the revoluble column only by the positive application of power thereto, a boom mounted on the revoluble column, cables mounted on said mast and said boom for hoisting the load and for lifting said boom, winches mounted adjacent said mast for severally winding up said cables, reversible gear sets locking against reversal by the load for severally rotating said winches in either direction of rotation, and a single means for applying power to said gear sets.

21. In a swinging crane, a mast including a fixed column and a revoluble column mounted thereon, means for rotating the revoluble column only by the positive application of power thereto, a boom mounted on the revoluble column, cables mounted on said mast and said boom for hoisting the load and for lifting said boom, winches mounted adjacent said mast for severally winding up said cables, reversible gear sets locking against reversal by the load for severally rotating said winches in either direction of rotation, said gear sets being mounted adjacent each other, and a single means for applying power to said gear sets and including chain sprockets extending in the same plane.

22. In a swinging crane, a mast including a fixed column and a revoluble column mounted thereon, means for rotating the revoluble column only by the positive application of power thereto, a boom mounted on the revoluble column, cables mounted on said mast and said boom for hoisting the load and for lifting said boom, winches mounted adjacent said mast for severally winding up said cables, reversible gear sets locking against reversal by the load for severally rotating said winches in either direction of rotation, said gear sets being mounted in a pile formation and on the same side of said mast as said hoisting winch, and a single means for applying power to said gear sets.

23. In a swinging crane, a mast including a fixed column and a revoluble column mounted thereon, means for rotating the revoluble column only by the positive application of power thereto, a boom mounted on the revoluble column, cables mounted on said mast and said boom for hoisting the load and for lifting said boom, winches mounted adjacent said mast for severally winding up said cables, brakes for holding each of said winches stationary except upon the positive application of power thereto, and reversible means for independently rotating said winches.

24. A crane comprising a fixed mast, a mast rotatably supported on said fixed mast, and including keys extending therefrom, means supported on said fixed mast and having keyways therein engaged by the keys on said rotatable mast for positively transmitting torque therebetween, the keys being laterally and vertically movable in the keyways upon shifting of said rotatable mast relative to the fixed mast without transmitting stresses therebetween, and a connection transmitting torque from a source of power to said means.

25. A mast structure for a revolving crane comprising a fixed column, a rotatable column mounted in spaced relation on the fixed column, and a sleeve mounted on the fixed column, the rotatable column and the sleeve being interconnected for positive transmission of torque and for relative lateral and vertical movement therebetween.

26. A mast structure for a revolving crane comprising a fixed column formed with spaced walls at the lower portion thereof, a rotatable column supported on the outer wall and at the upper end of the fixed column, and a sleeve mounted on the fixed column between the fixed and the rotatable columns, the rotatable column and the sleeve engaging for transmission of torque and for relative tilting movement therebetween.

27. A mast structure for a revolving crane comprising a fixed column formed with spaced walls at the lower portion thereof, the upper edge of the outer column wall forming a bearing raceway, bearing elements mounted in the raceway, a rotatable column having its lower end formed as a raceway to rest on the bearing elements and supported at its upper end on the fixed column, and a sleeve rotatably mounted on the fixed column and engaging with the rotatable column for the positive transmission of torque and regardless of relative tilting movement therebetween.

28. A mast structure for a revolving crane comprising a fixed column formed with spaced walls at the lower portion thereof, the upper surface of the outer wall of the fixed column forming a bearing raceway, bearing elements mounted in the raceway, a rotatable column having its lower end formed as a raceway to rest on the bearing elements and supported at its upper end on the fixed column, the rotatable column having keys projecting into the space between the columns, and a sleeve rotatably mounted on the fixed column and extending outwardly therefrom toward the rotatable column, the sleeve having keyways formed therein for engaging with the keys of the rotatable column and positively transmitting torque and for relative lateral and vertical movement therebetween.

29. In a revolving crane including a fixed column and a rotatable column mounted thereon, a boom mounted on the rotatable column, cables mounted on the mast and the boom, and winches for severally winding up the cables for hoisting a load and for lifting the boom; gear sets independently driving the rotatable mast column and the load hoisting and boom lifting winches, and a single means for transmitting power to all of the gear sets from a source of power.

30. In a revolving crane including a fixed column and a rotatable column mounted thereon, a boom mounted on the rotatable column, cables mounted on the mast and the boom, and winches for severally winding up the cables for hoisting a load and for lifting the boom; a plurality of gear sets mounted as a unit for severally rotating the rotatable mast column and the winches, and a single means for applying power to the gear sets.

31. In a revolving crane including a fixed column and a rotatable column mounted thereon, a boom mounted on the rotatable column, cables mounted on the mast and the boom, and winches for severally winding up the cables for hoisting a load and for lifting the boom; a plurality of reversible gear sets independently driving the rotatable mast column and the winches, the gear sets being mounted in pile formation as a unit, and single means for transmitting power to all of the gear sets.

NICHOLAS M. ERDAHL.